(12) United States Patent
Bell

(10) Patent No.: US 6,786,988 B1
(45) Date of Patent: Sep. 7, 2004

(54) USE OF WASTE CARPET AS FILLER

(75) Inventor: Michael E. Bell, Lexington, VA (US)

(73) Assignee: Mohawk Brands Inc., Wilmington, DE (US)

( * ) Notice: Subject to any disclaimer, the term of this patent is extended or adjusted under 35 U.S.C. 154(b) by 169 days.

(21) Appl. No.: 09/986,058

(22) Filed: Nov. 7, 2001

Related U.S. Application Data

(63) Continuation of application No. 09/782,518, filed on Feb. 14, 2001, now abandoned.

(51) Int. Cl.[7] .............................................. B32B 31/00
(52) U.S. Cl. ......................... 156/72; 264/138; 264/140; 428/95; 428/97
(58) Field of Search ....................... 428/95, 97; 156/72; 264/138, 140

(56) References Cited

U.S. PATENT DOCUMENTS

| | | |
|---|---|---|
| 5,169,870 A | 12/1992 | Corbin et al. |
| 5,240,530 A | 8/1993 | Fink |
| 5,288,349 A | 2/1994 | Fink |
| 5,294,384 A | 3/1994 | David et al. |
| 5,430,068 A | 7/1995 | Subramanian |
| 5,497,949 A | 3/1996 | Sharer |
| 5,498,667 A | 3/1996 | David et al. |
| 5,518,188 A | 5/1996 | Sharer |
| 5,547,731 A | 8/1996 | Tesch |
| 5,578,357 A | 11/1996 | Fink |
| 5,728,444 A | 3/1998 | Fink |
| 5,728,741 A | 3/1998 | Zegler et al. |
| 5,814,673 A | 9/1998 | Khait |
| 5,855,981 A | 1/1999 | Zegler et al. |
| 5,906,877 A | 5/1999 | Popper et al. |
| 5,912,062 A | 6/1999 | Kotliar et al. |
| 5,914,353 A | 6/1999 | Grizzle et al. |
| 6,051,300 A | 4/2000 | Fink |

FOREIGN PATENT DOCUMENTS

| | | | |
|---|---|---|---|
| AT | 406 169 B | 7/1999 | |
| EP | 0 747 525 A2 | 12/1996 | |
| EP | 0 710 305 B1 | 5/1998 | |
| EP | 0 867 557 A2 | 9/1998 | |
| EP | 0 891 848 A2 | 1/1999 | |
| EP | 0 943 728 A1 | 9/1999 | |
| JP | 60206868 A * | 10/1985 | ......... C08L/101/00 |
| JP | 63092765 | 4/1988 | |
| WO | WO 99/40250 | 8/1999 | |
| WO | WO 9940250 A2 * | 8/1999 | ............ D06N/7/00 |

* cited by examiner

Primary Examiner—Cheryl A. Juska
(74) Attorney, Agent, or Firm—Nixon & Vanderhye P.C.

(57) ABSTRACT

By utilizing specially processed waste carpeting as a filler in the production of carpet backcoating, roofing materials, or other similar products, the amount of waste carpeting that is landfilled or otherwise disposed of is significantly reduced as is the need for mining the mineral fillers. Waste carpeting (post-consumer and/or waste from new carpet manufacture) containing calcium carbonate and a thermoplastic resin is collected and size-reduced to a size corresponding to the size of calcium carbonate typically used as a filler. The size-reduced waste carpeting is added as filler to at least one other material, such as polymers in standard latex, EVA, or PVC carpet backcoatings, to provide a composite used in the manufacture of a useful product (like carpet backcoating), and then the composite material is used to make the useful product (such as carpet backcoating, which is used as a primary or secondary backcoating in the manufacture of new carpeting). The waste carpeting may provide between 0-100% of the filler of carpet backcoating, with any remainder made up by conventional fillers, such as calcium carbonate.

2 Claims, 2 Drawing Sheets

USE OF WASTE CARPET AS FILLER

This application is a continuation of application Ser. No. 09/782,518, filed Feb. 14, 2001, now abandoned, the entire content of which is hereby incorporated by reference in this application.

BACKGROUND AND SUMMARY OF THE INVENTION

In the conventional manufacture of carpeting, tufted pile yarns or like facings are held in place by a primary backing, and typically a secondary backing—as well as possibly other layers—also associated with the carpeting. At least some of the carpet backings (particularly latex, EVA, PVC, or other polymer-based backings) use filler as an important component thereof. The standard filler that is used is a mineral filler, typically calcium carbonate, alone, or in combination with some other materials During the carpet manufacturing process there is waste carpeting produced, which is typically landfilled or burned. When new carpets are installed in place of old carpeting, the used, waste carpeting (which is post-consumer waste at that point) is ripped up and also typically landfilled or burned. The calcium carbonate, or like mineral fillers, that are used in carpet backings are mined, and therefore have associated therewith the conventional problems associated with the mining of materials. In certain waste carpeting materials, other materials, such as thermoplastic resins, form constituent parts of the waste material together with the calcium carbonate filler and are recoverable.

According to the present invention, methods of recycling waste carpeting, including calcium carbonate and thermoplastic resin materials, and carpeting produced utilizing such recycled materials, are provided which substantially eliminate or significantly reduce the problems discussed above. According to the present invention instead of using calcium carbonate, which is mined, as the filler for a carpet backing, recycled waste carpet containing calcium carbonate as well as a thermoplastic resin (from new carpet production and/or from post-consumer waste) is used as a filler material. The recycled material may also be used in conjunction with fresh calcium carbonate, e.g., freshly mined, as well as fresh thermoplastic resin. This substantially eliminates, or at least significantly reduces, the amount of landfilling or other waste disposal that is necessary for waste carpeting.

While the invention is particularly useful for recycling waste carpet in the manufacture of new carpeting, the invention is also applicable to the production of other materials containing fillers, including various extruded thermoplastic and thermoset materials that typically use calcium carbonate filler, including, but not limited to, roofing materials, road paving materials, awnings, and tarps.

According to one aspect of the present invention there is provided a method of recycling waste carpeting comprising substantially sequentially: (a) collecting waste carpeting; (b) processing the waste carpeting to provide a first material from the waste carpeting containing a filler and a thermoplastic resin; (c) adding the first material to a second material to provide a composite material useful in the manufacture of a useful product; and (d) making the useful product using the composite material.

In the method, step (a) may be practiced to collect substantially only post-consumer waste carpeting, substantially only waste carpeting from new carpeting manufacture, or a blend of both. Post-consumer waste carpeting can be cleaned by any conventional cleaning technique before use, if desired or necessary. While the method is typically practiced utilizing all of the face yarn and primary backing, and backcoatings, under some circumstances the method may further comprise, as part of step (b), separating the face yarn and primary backing from waste carpeting backcoating to produce a substantially face yarn and primary backing-free waste carpeting backcoating, and using substantially only the waste carpeting backcoating. Also, various carpet backcoatings may be separated from each other so as to use only one particular carpet backcoating, such as the primary or secondary backcoating.

The invention also as part of step (b) includes reducing the first material to a predetermined size in a range of 50–100 to 95–325 wherein the first number represents the percentage of the first material which will pass through a mesh screen having a mesh size corresponding to the second number. Also, step (c) may include adding the first material to the second material to form a carpet backcoating and step (d) is practiced by making a carpet backcoating. Additionally, the composite material of step (c) may be processed in molten form to have a viscosity in the range of 10,000 to 30,000 CPS. The latter viscosity range is particularly used for forming a primary backcoating for carpeting. In one embodiment of the useful product formed hereby, the carpet product may have a backcoating with about 3–30% EVA copolymer, about 32–45% resin and 50% filler wherein the filler comprises calcium carbonate and a predetermined percentage of the composite material.

In another embodiment hereof, the method may be practiced employing steps (a) and (b) above, and in lieu of steps (c) and (d), (c) heating the first material to a temperature enabling the first material to flow and (d) flowing the first material onto a second material to bond the first and second materials to one another to form a useful product. Thus, the waste carpet material when in flowable form may be placed for example on the backside of fiberglass carpet tile where the material bonds to itself and to the fiberglass when subjected to heat.

It will be appreciated that the method hereof is useful to form carpet backcoatings comprised of EVA or PVC or other polymer base backcoatings. The invention also further typically comprises making new carpeting With the carpet backcoating. Additionally, the method hereof is useful to form carpet backcoatings comprised of SBR latex compounds wherein the recycled calcium carbonate filler may be used in lieu of or in combination with fresh calcium carbonate to form the carpet backcoating in conjunction with other materials. Further, the composite material may be used to produce extruded thermoplastic or thermoset products.

DETAILED DESCRIPTION OF THE DRAWINGS

Figure 1:
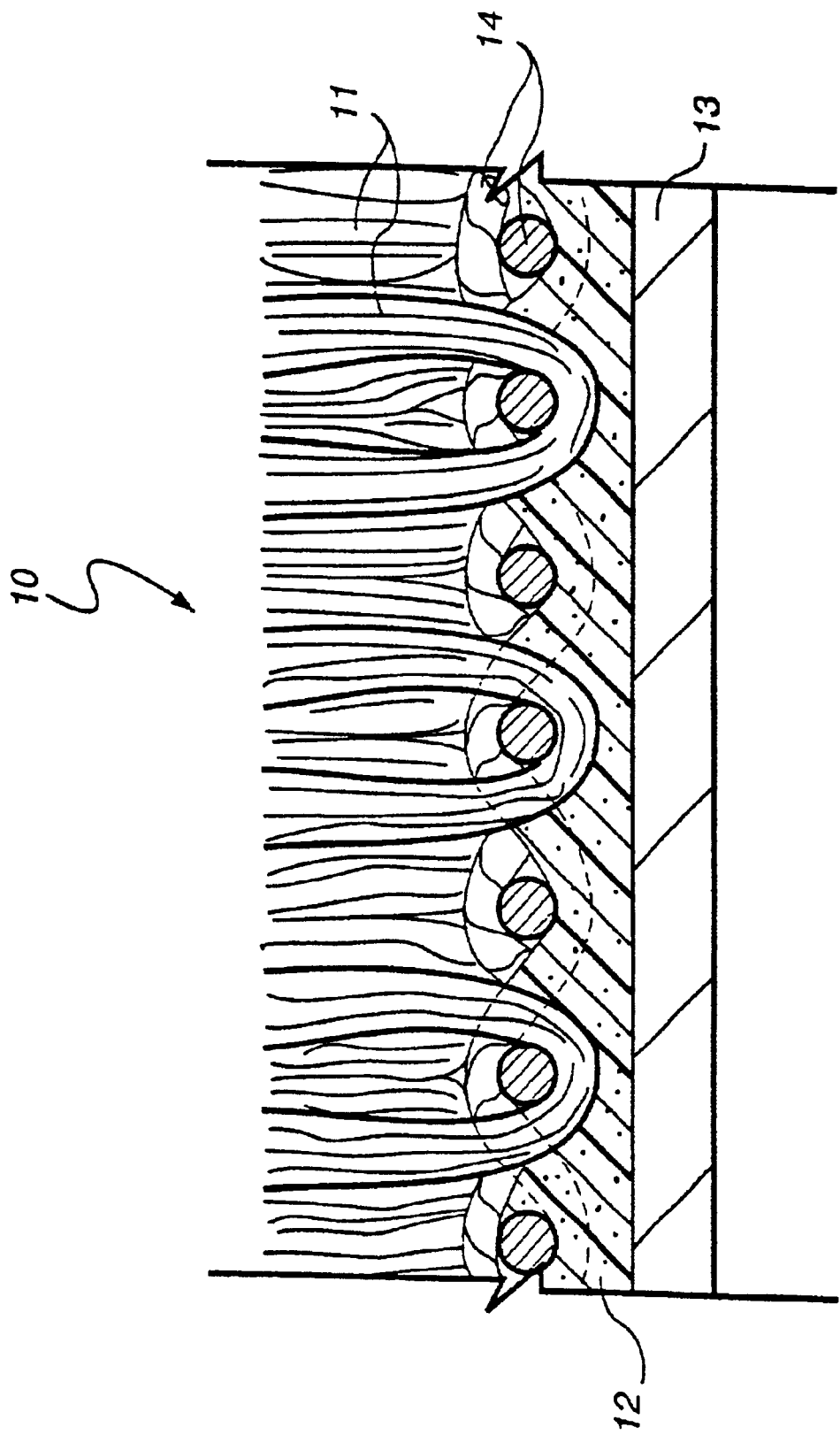
FIG. 1 is a schematic cross-sectional view of conventional carpeting, or carpeting produced according to the present invention.

A standard construction of carpeting is illustrated schematically by reference numeral 10 in FIG. 1. The carpeting includes face yarn 11, tufted into a woven or spun bonded fabric 14 known as a primary backing. The primary backing 14 has pile yarns 11 tufted therethrough extending outwardly from one face, a primary backcoating or precoat 12 on the opposite face, and at least one secondary backcoating or main coat 13. Other layers may also be associated with the carpeting 10. The primary backcoating or precoat 12 typically comprises latex, PVC (polyvinylchloride), EVA (ethylene vinyl acetate), or other polymer-based material, and the secondary backcoating 13 may also comprise or include polymers. Typically one or both of the primary backcoatings 12 and secondary backcoating(s) 13 include filler. The most common filler is mineral filler, typically calcium carbonate, although other fillers may be utilized, or calcium carbonate can be used with other common materials such as metal salts. According to the invention, carpeting 10 may be produced with the filler of one or both of the primary backcoating 12 and secondary backcoating(s) 13 comprising waste carpeting instead of calcium carbonate as all or part of the filler.

The carpeting 10 may also have any number of other layers, depending upon use. For example the carpeting 10 may have a conventional secondary backing (typically a woven or needle punched fabric adapted to contact the floor or padding).

Figure 2:
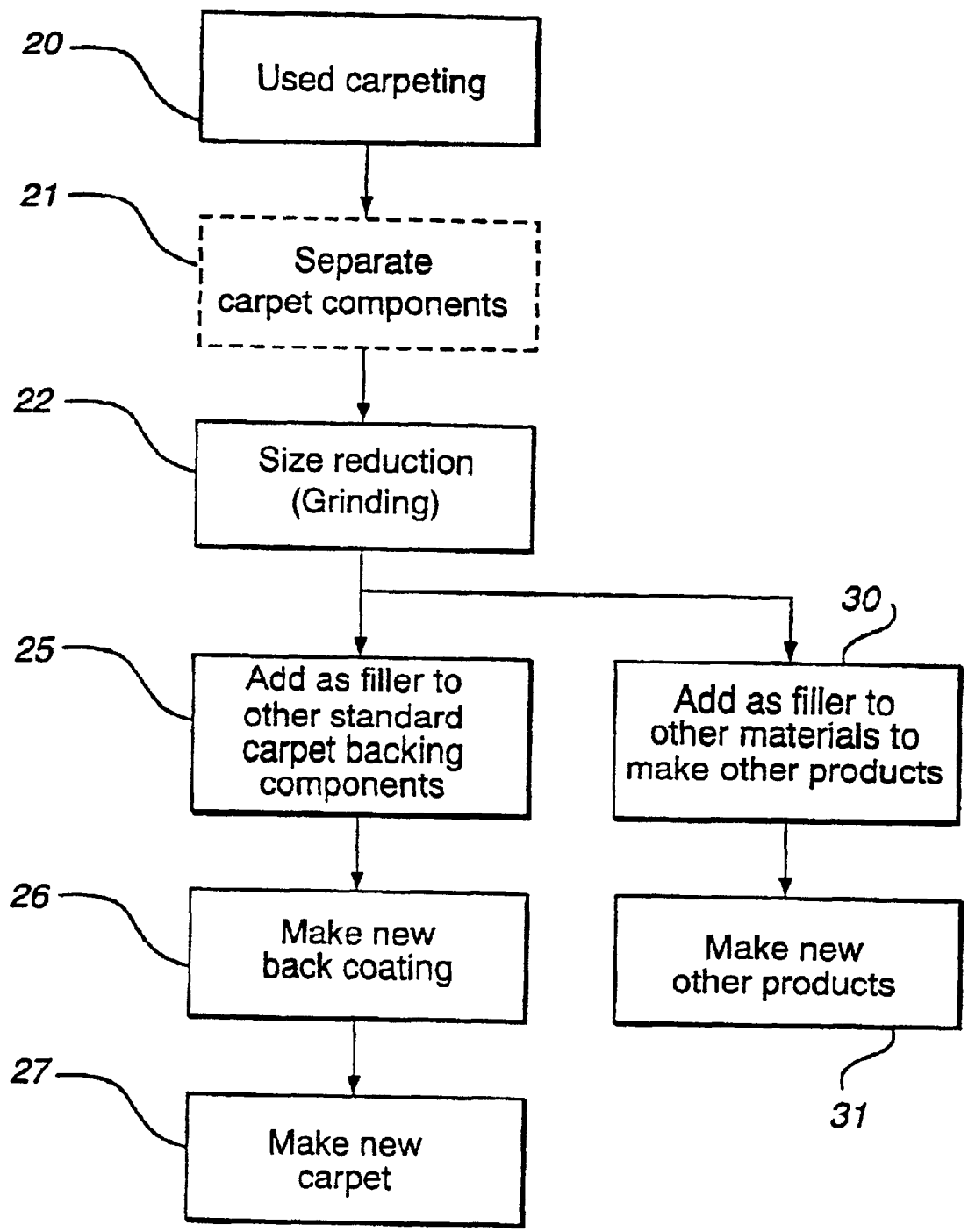
FIG. 2 is a block diagram illustrating various method procedures that may be practiced according to the present invention.

FIG. 2 schematically illustrates an exemplary process according to the present invention. In the process, used carpeting is initially collected as indicated at 20 in FIG. 2. The collection may comprise post-consumer waste carpeting, waste carpeting from the standard procedures associated with the manufacture of new carpeting, or both. If the used carpeting collected at 20 is contaminated in any significant manner it may be cleaned using any suitable conventional technique (either before or after size-reduction as hereinafter described).

It is contemplated that according to the present invention the waste carpeting that is subsequently employed in the practice of the invention is substantially all components of waste carpeting, including the face yarns, primary backing, and primary and secondary backcoatings, and perhaps other components. However under some circumstances for either part or all of the waste carpeting it may be desirable to separate the face and primary backing and backcoatings from each other before further procedures. The optional separation of the carpet components is illustrated schematically at 21 in FIG. 2. The separation may be accomplished, depending upon whether the face and all backings and backcoatings are to be separated, utilizing any suitable conventional technique, such as generally described in U.S. Pat. No. 5,728,741 (the disclosure of which is hereby incorporated by reference herein). If only a certain backing or backcoating is used, an attempt may be made to match it with the manufacture of new backing or backcoating of substantially the same type (e.g., latex backcoating).

While a number of different types of waste carpet material may be used, it has been found particularly beneficial to process waste carpeting having as constituent components calcium carbonate and a thermoplastic resin mixture. One such waste carpet material is known as Co-Product (Residue from Carpet Recycling Process) manufactured by Evergreen Nylon Recycling LLC, a joint venture of DSM and Honeywell in Augusta, Ga. in which the waste carpet material includes calcium carbonate 50–70%, a thermoplastic resin mixture 0–45%, nylon 0–45% and caprolactam 0–8%, all percentages being by weight. Other trace materials may also appear in the waste material. This material is particularly useful as part or all of the filler for a backcoating for use in carpet manufacture comprised of 3–30% EVA copolymer; 15–65% resin, such as ECR-171 from Exxon; and 30–70% calcium carbonate filler, JR-78, all percentages again being by weight. It is believed these waste product materials are particularly beneficial because at normal temperatures for forming the carpet backcoating under the preceding formula, the waste carpet material has temperature, flowability and viscosity parameters substantially corresponding with the standard backcoating according to that formula.

Turning back to FIG. 2, whether or not the proper components are separated, the waste carpet material comprising the calcium carbonate and the thermoplastic resin are reduced in size to a particular size corresponding to a filler size used to produce the backcoating for carpeting. Consequently, the carpet waste material is reduced in size, preferably ground, to a typical grind useful for resin and latex based compounds for use in backcoating of carpet. This grinding can be achieved with conventional machinery used in the filler trade such as a Raymond Roller Mill or an Imp Mill. Although not necessary with the material described, cryogenic grinding could also be used. No special equipment is needed for grinding the waste carpet material. The ground particulate size has a range of 50–100 to 95–325 and particularly a 78–200 grind is preferred (the first number represents the percentage of the material which will pass through a mesh screen having a mesh size corresponding to the second number). The particulate size of the waste carpet material is significant in that it has been found that the same material in larger size when added to a molten resin caused foaming of the material which could lead to manufacturing problems. It was found however that by grinding the material to a size corresponding substantially to the size of standard filler material used to manufacture new carpet or by adding the larger size material before the molten resin, the foaming problem did not materialize. Consequently the ground waste carpet material could be added as filler to other standard carpeting backing components as indicated at 25 in drawing FIG. 2.

In the preferred procedure according to the present invention, the properly sized waste carpeting may be used as a filler with other standard carpet backcoating components, either for primary backcoating or a secondary backcoating or other backing elements of carpeting (typically collectively referred to as main coats). For example, the ground waste carpet material may be used in conjunction with latex, EVA, or PVC backcoatings of conventional construction and may be used substantially as the only filler material or can replace a significant amount of the filler material when combined with standard fresh filler material.

It has also been found that the waste carpet material when ground and added to molten resin used in the production of a main backcoating and heated to approximately 325° F. yielded a viscosity of the mix of about 14,000 CPS. A viscosity within a range of 10,000–30,000 CPS is appropriate for the formation of a backcoating for carpeting in accordance with the above formula. These temperatures and viscosities are amenable for production in existing backcoating producing equipment. That is, the viscosity is significant inasmuch as the molten resin must be pumped to various machinery and also must flow at a certain rate on a applicator roll or through a slot die or an extruder for disposition on the back of the carpet at a predetermined thickness. It will be appreciated that the waste carpet material ground to appropriate size may be a substitute for all or a portion of fresh calcium carbonate filler in the formation of a new carpeting product. Thus, once the backcoating is formed from the carpet waste material as illustrated by box 26 in FIG. 2, the flowable backcoating formed of recycled carpet waste material in whole or in part is applied to the back of the carpet in a predetermined thickness as indicated at 27 in FIG. 2. That is, the waste carpeting filler according to the present invention is mixed with the other components using standard equipment and techniques and then ultimately new carpet backcoating is produced as indicated at 26 in FIG. 2 again using conventional techniques. The new carpet backcoating incorporating the waste carpet material may then be used to make the new carpet again by conventional techniques as schematically illustrated at 27 in FIG. 2. The backing from 26 may be used as the primary backcoating 12 or a secondary backcoating 13 of the carpet or as filler in all of the backcoatings.

The ground material from 22 in FIG. 2 may also be added to a PVC main coat to replace some of the normal or fresh calcium carbonate filler. PVC is used as a backing on most carpet tiles. Consequently, a process for forming a typical mix for a PVC main coat may comprise: (a) collecting waste carpeting; (b) processing the waste carpeting to provide a first material from the waste carpeting containing a filler and a thermoplastic resin; (c) adding the first material to a second material to provide a composite material useful in the manufacture of a useful product; and, (d) making the useful product using the composite material.

Further, the waste carpet material when ground has a melting point sufficient to render the material flowable at a certain temperature for example 150° C. While the ground material does not completely melt because of the calcium carbonate content, the capacity of the material to melt at reasonable temperatures enables the application of a layer of the material onto a fiberglass backing normally used to stabilize a carpet tile. Thus, by applying the material at temperature for flowability, the material bonds to itself and to the fiberglass backing of the carpet tile when heated.

Still further, the waste carpet material, when ground as indicated above, may also be used as a filler in SBR latex compounds used throughout the industry for laminating carpet. A typical formula for latex compounds could be water, 5–20%; SBR latex, such as Reicholds 68909 20–40%; minor constituents such as foamers and stabilizers needed for compounding, 1–5%; and a calcium carbonate filler from 0–70%. The waste carpet material of the present invention may be used in lieu of the calcium carbonate filler typically used in these latex compounds in the same percentage, i.e., 0–70%. Thus, the waste carpet may entirely replace the fresh calcium carbonate filler typically used in whole or in part, i.e., may be blended with the fresh calcium carbonate filler. Preferably, a significant amount of the calcium carbonate can be replaced by the size-reduced waste carpeting. For example, about 40% of the filler of the carpet backcoating may be size-reduced waste carpeting. In the above example, about 20–50% of the carpet backcoating may be size-reduced waste carpeting filler and about 0–30% calcium carbonate filler, e.g., about 25% each of size-reduced waste carpeting and calcium carbonate as fillers.

It will be appreciated that the use of the waste carpet material has applications other than in the formation of new carpets or carpet tiles. For example, the waste carpeting may be added as a filler to other materials to make other useful products such as extruded thermoplastic or thermoset materials that can typically use calcium carbonate or other mineral fillers. A number of other products that may be made comprise almost all products that typically can use calcium carbonate (or its equivalent) as the filler and some of the new products that can be made include roofing materials, awnings, road surfacing materials and tarps as illustrated at 30 and 31 in FIG. 2, all of which contain mineral fillers. The reduction in size of the waste material may not be as small as for carpet backcoatings for such other end products.

During any of the procedures described above, various conventional refinements may be employed. For example, screening or other contaminate removal practices may be employed as desired to produce a product with the desired properties.

As a consequence of this invention, it is possible to substantially eliminate or significantly reduce land filling or other disposal of waste carpeting and at the same time reduce the mining of mineral fillers without sacrificing product quality by using processed waste carpeting as a filler for carpet backcoatings, roofing materials, and other products.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and processes.

What is claimed is:

1. A method of recycling waste carpeting and forming a new carpet containing the recycled waste carpeting comprising:

(a) collecting waste carpeting containing calcium carbonate and thermoplastic materials;

(b) processing the waste carpeting to provide a first material from the waste carpeting containing a first filler including the calcium carbonate and the thermoplastic materials and reducing the first material to a predetermined size in a range of 50–100 to 95–325 wherein the first number represents the percentage of the first material which will pass through a mesh screen having a mesh size corresponding to the second number;

(c) adding the first material to a second material to provide a composite material useful in the manufacture of the new carpet; and (d) making the new carpet containing the composite material;

wherein step (c) is practiced to produce a latex carpet backcoating and step (d) includes making new carpeting with the latex carpet backcoating.

2. A method of recycling waste carpeting and forming a new carpet containing the recycled waste carpeting comprising:

(a) collecting waste carpeting containing calcium carbonate and thermoplastic materials;

(b) processing the waste carpeting to provide a first material from the waste carpeting containing a first filler including the calcium carbonate and the thermoplastic materials and reducing the first material to a predetermined size in a range of 50–100 to 95–325 wherein the first number represents the percentage of the first material which will pass through a mesh screen having a mesh size corresponding to the second number;

(c) adding the first material to a second material to provide a composite material useful in the manufacture of the new carpet; and (d) making the new carpet containing the composite material;

wherein step (c) is practiced to produce a carpet latex backcoating containing about 5–20% water, 20–40% latex and a second filler of up to 70% calcium carbonate and step (d) includes making a new latex-backed carpet containing the composite material.

* * * * *